(12) United States Patent
Ha

(10) Patent No.: US 11,544,913 B2
(45) Date of Patent: Jan. 3, 2023

(54) METHOD AND SYSTEM FOR WEARABLE DEVICE-BASED MANUAL PROVIDING

(71) Applicant: VIRNECT inc., Seoul (KR)

(72) Inventor: Tae Jin Ha, Gimpo-si (KR)

(73) Assignee: VIRNECT INC., Seoul (KR)

( * ) Notice: Subject to any disclaimer, the term of this patent is extended or adjusted under 35 U.S.C. 154(b) by 0 days.

(21) Appl. No.: 17/564,107

(22) Filed: Dec. 28, 2021

(65) Prior Publication Data

US 2022/0207839 A1 Jun. 30, 2022

(30) Foreign Application Priority Data

Dec. 29, 2020 (KR) .................. 10-2020-0186435

(51) Int. Cl.
*G06T 19/00* (2011.01)
*G06F 3/0483* (2013.01)
*G06V 20/64* (2022.01)
*G06F 3/01* (2006.01)

(52) U.S. Cl.
CPC ............ *G06T 19/006* (2013.01); *G06F 3/012* (2013.01); *G06F 3/0483* (2013.01); *G06V 20/64* (2022.01); *G06T 2200/24* (2013.01)

(58) Field of Classification Search
None
See application file for complete search history.

(56) References Cited

U.S. PATENT DOCUMENTS

2015/0091780 A1* 4/2015 Lyren .................. G02B 27/017
345/8

FOREIGN PATENT DOCUMENTS

KR 101397908 B1 5/2014
WO WO-2018165278 A1 * 9/2018 ......... A63B 24/0021

* cited by examiner

*Primary Examiner* — Steven Z Elbinger
(74) *Attorney, Agent, or Firm* — STIP Law Group, LLC

(57) ABSTRACT

A method for providing a manual based on a wearable device according to an embodiment of the present disclosure, as a method for providing an augmented reality (AR)-based manual by a manual application executed by at least one processor of the wearable device, comprises obtaining at least one piece of AR manual content for a first work; and providing the AR manual content by executing the obtained AR manual content, wherein the providing AR manual content includes providing head position AR content that visualizes a head pose describing 3D position and 6 degrees of freedom information of the head of a user who has performed the first work and providing guidance image information that provides guidance on a first process within the first work.

10 Claims, 14 Drawing Sheets

[FIG. 1]
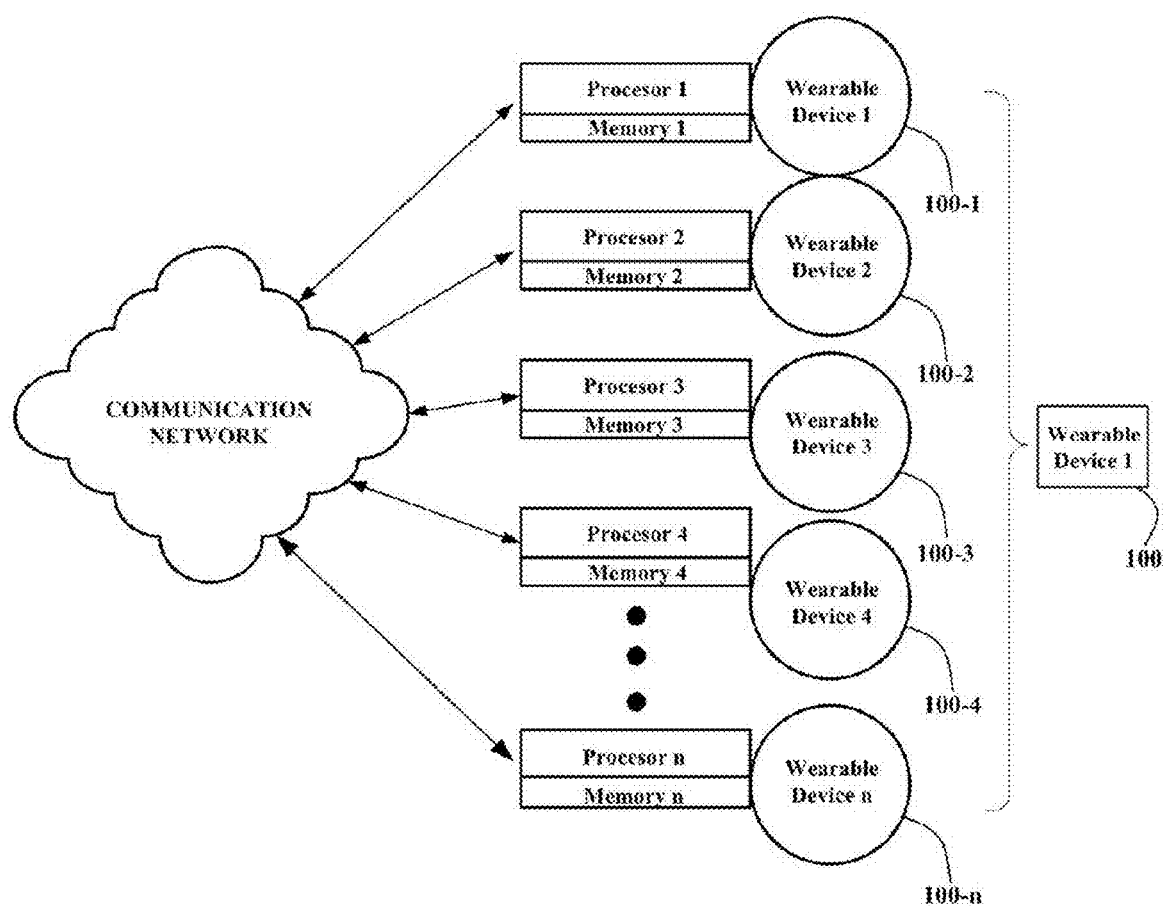

[FIG. 2]
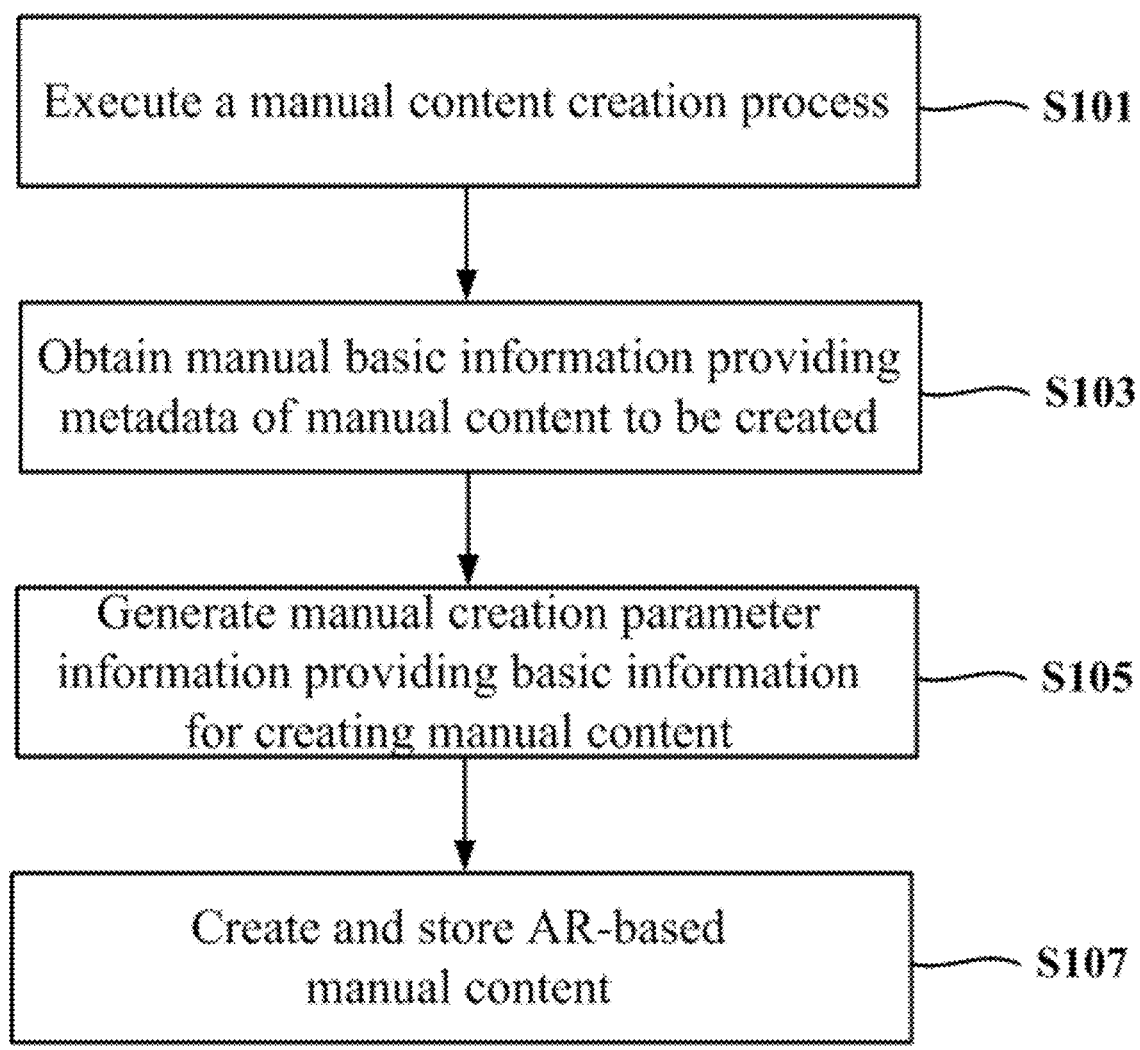

[FIG. 3]
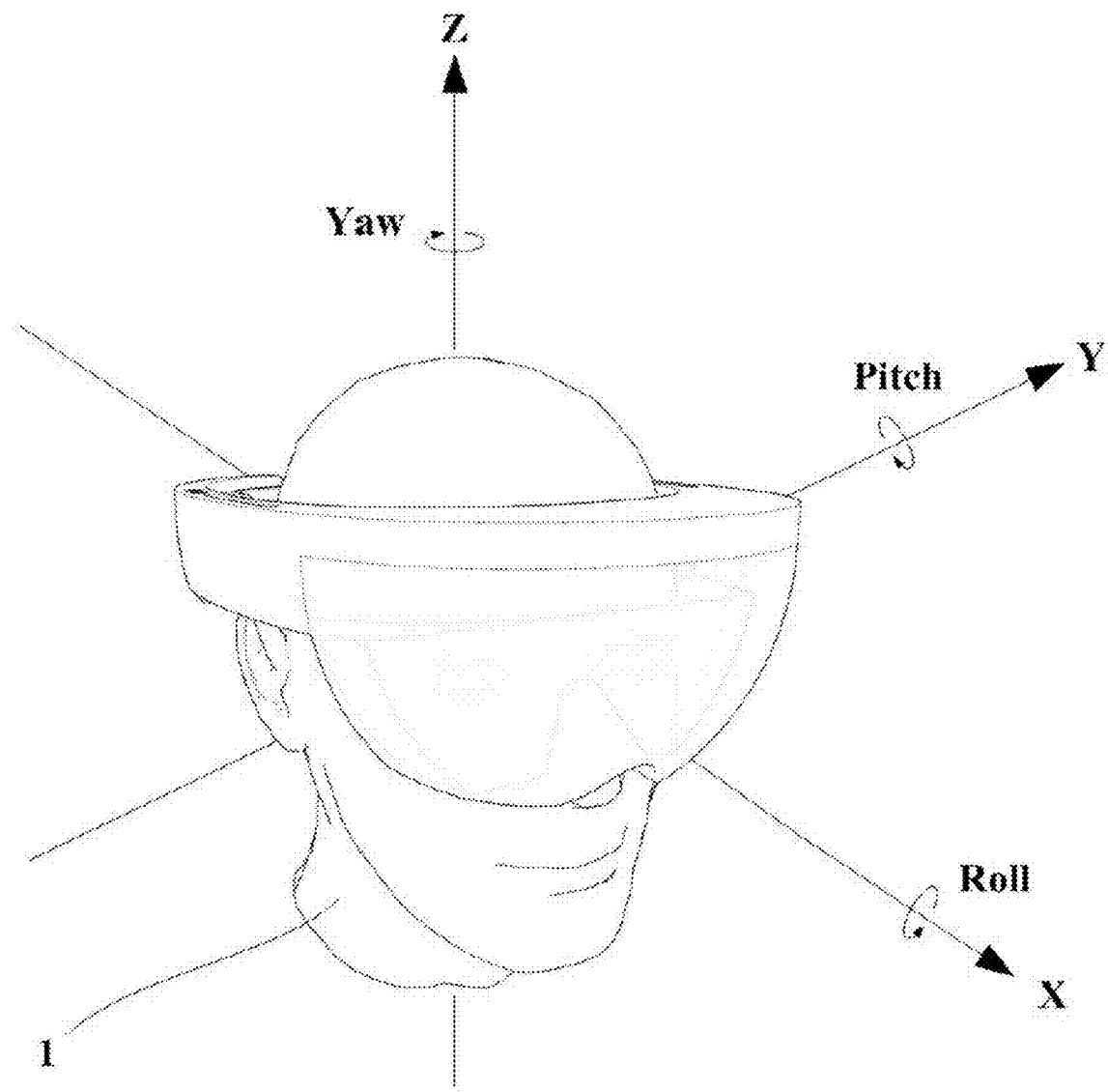

[FIG. 4]
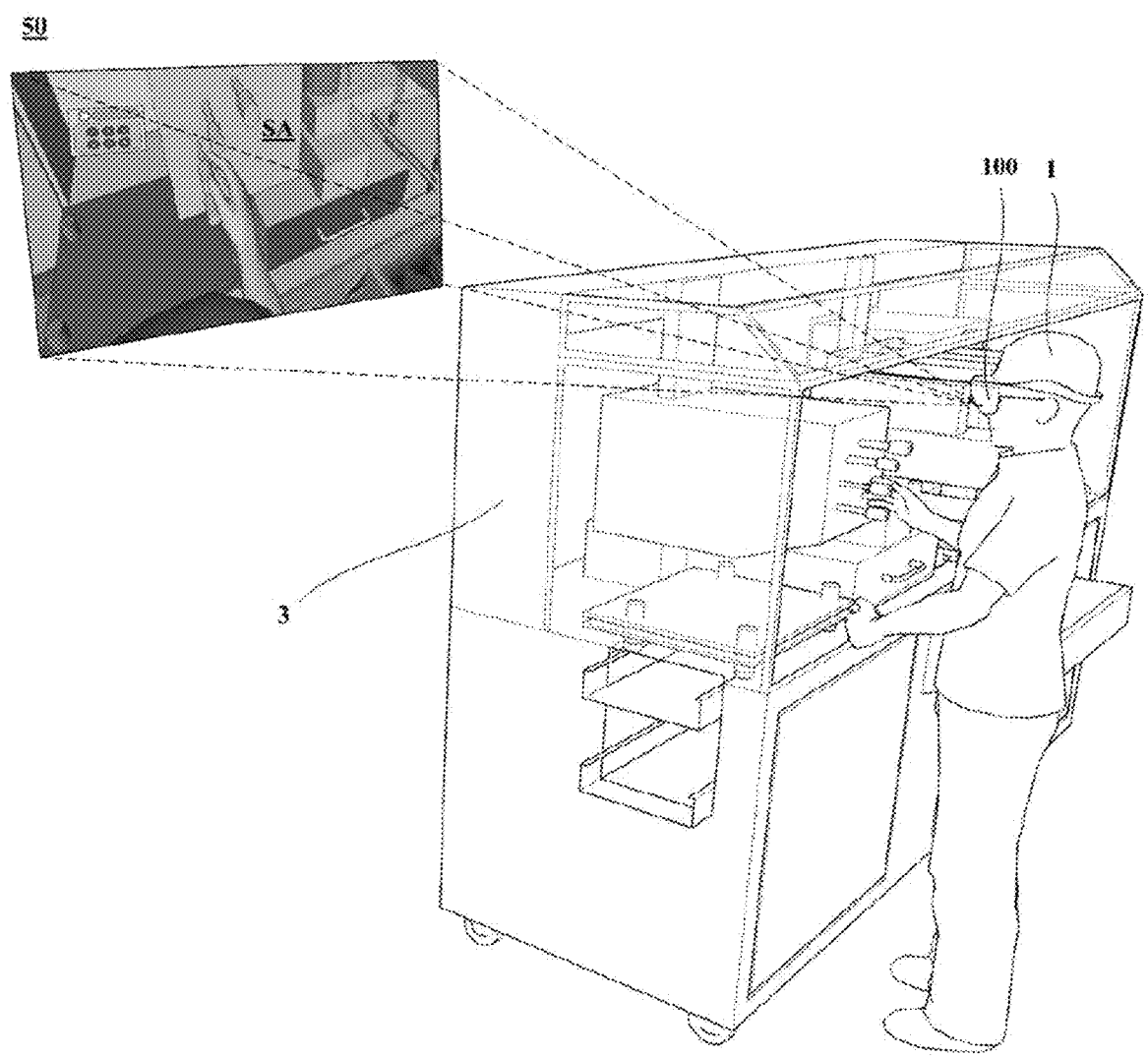

[FIG. 5]
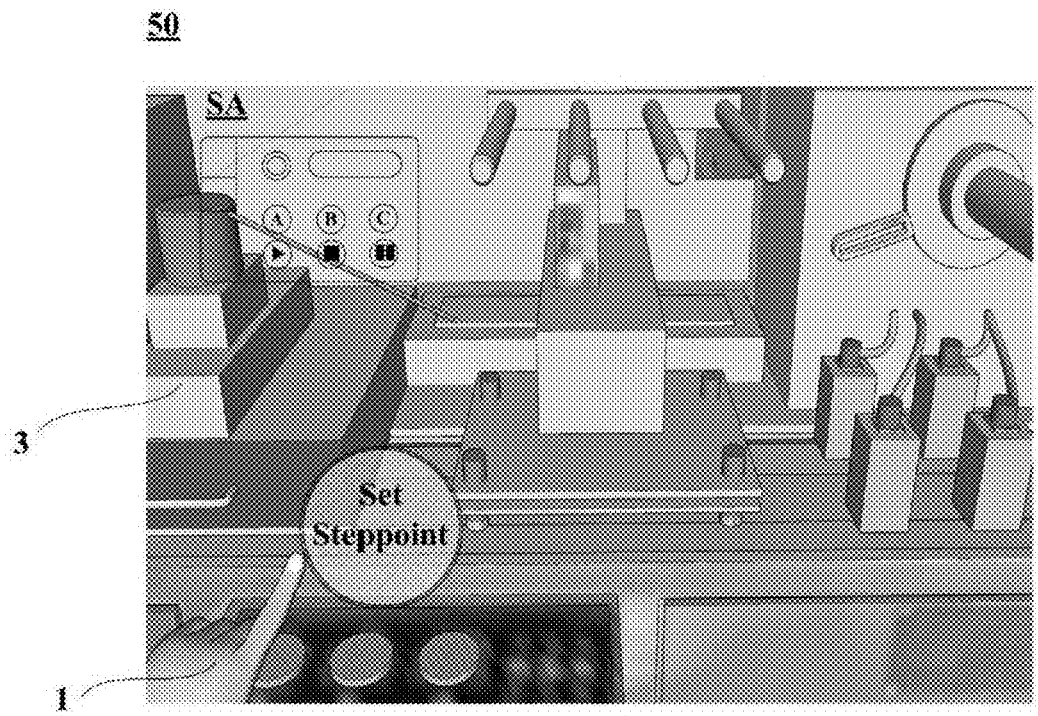
[FIG. 6]
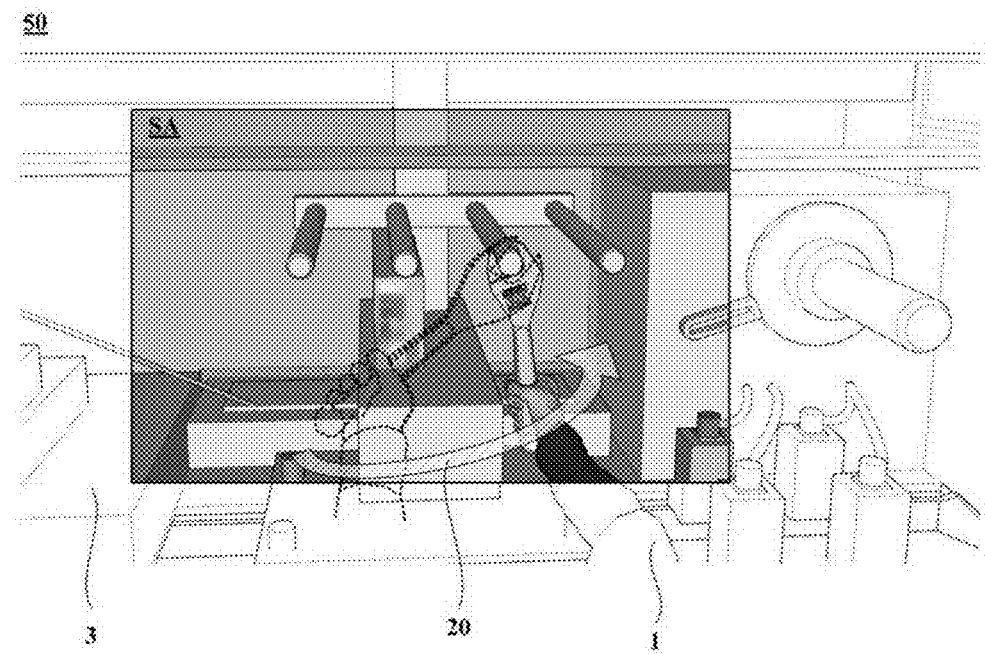

[FIG. 7]
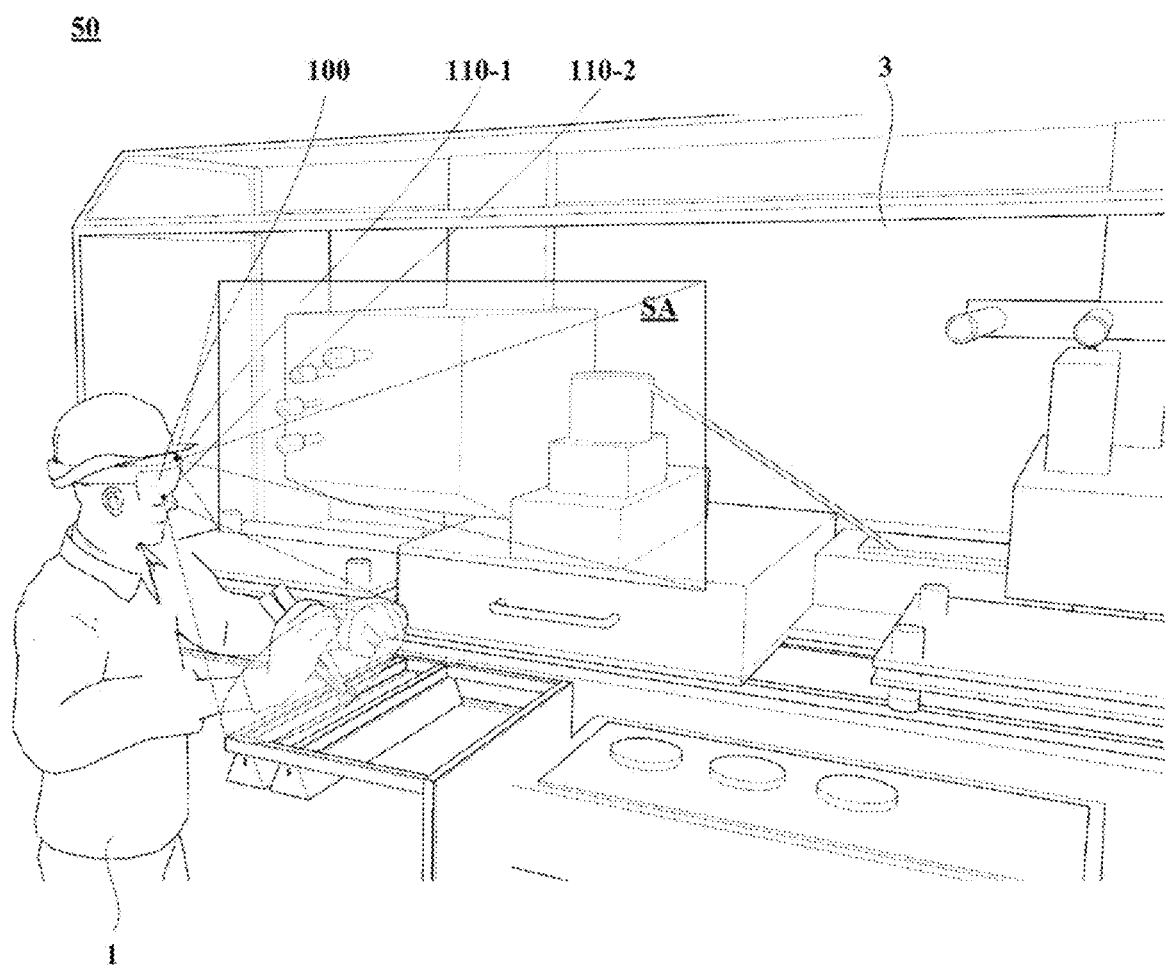

[FIG. 8]
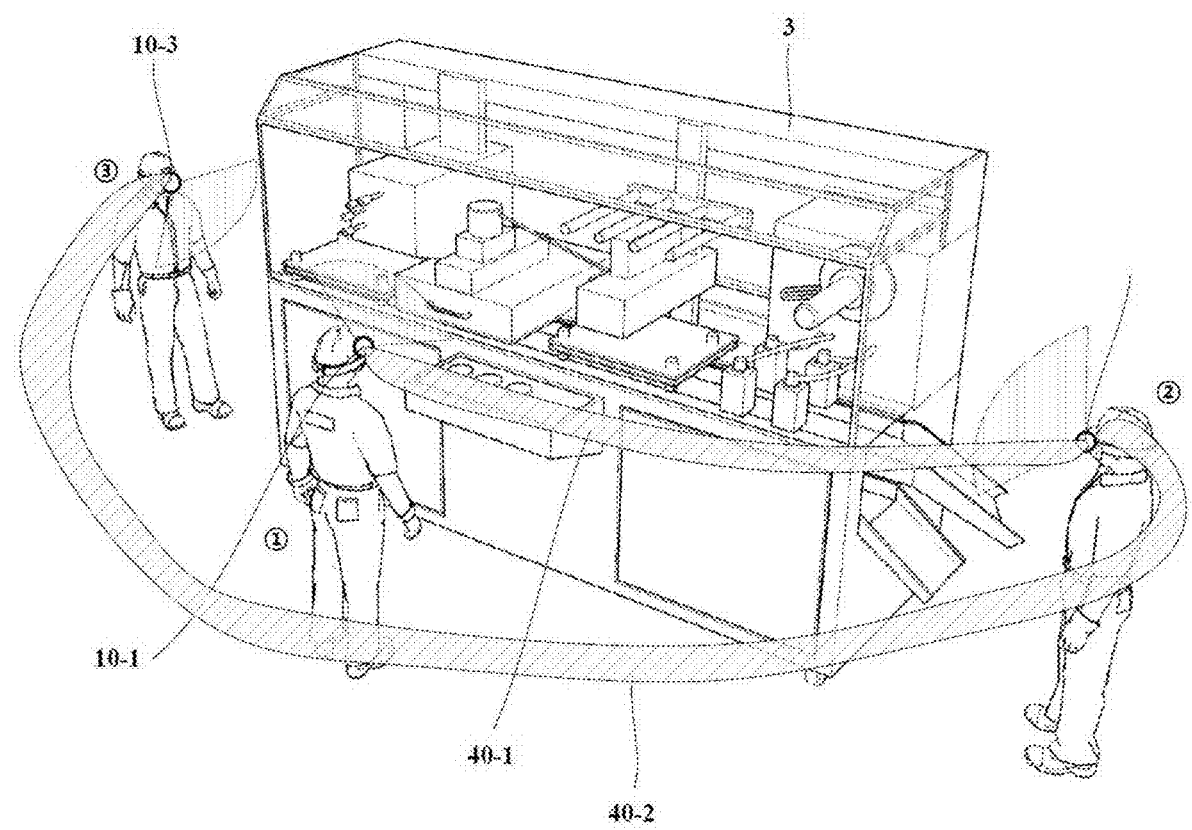

[FIG. 9]
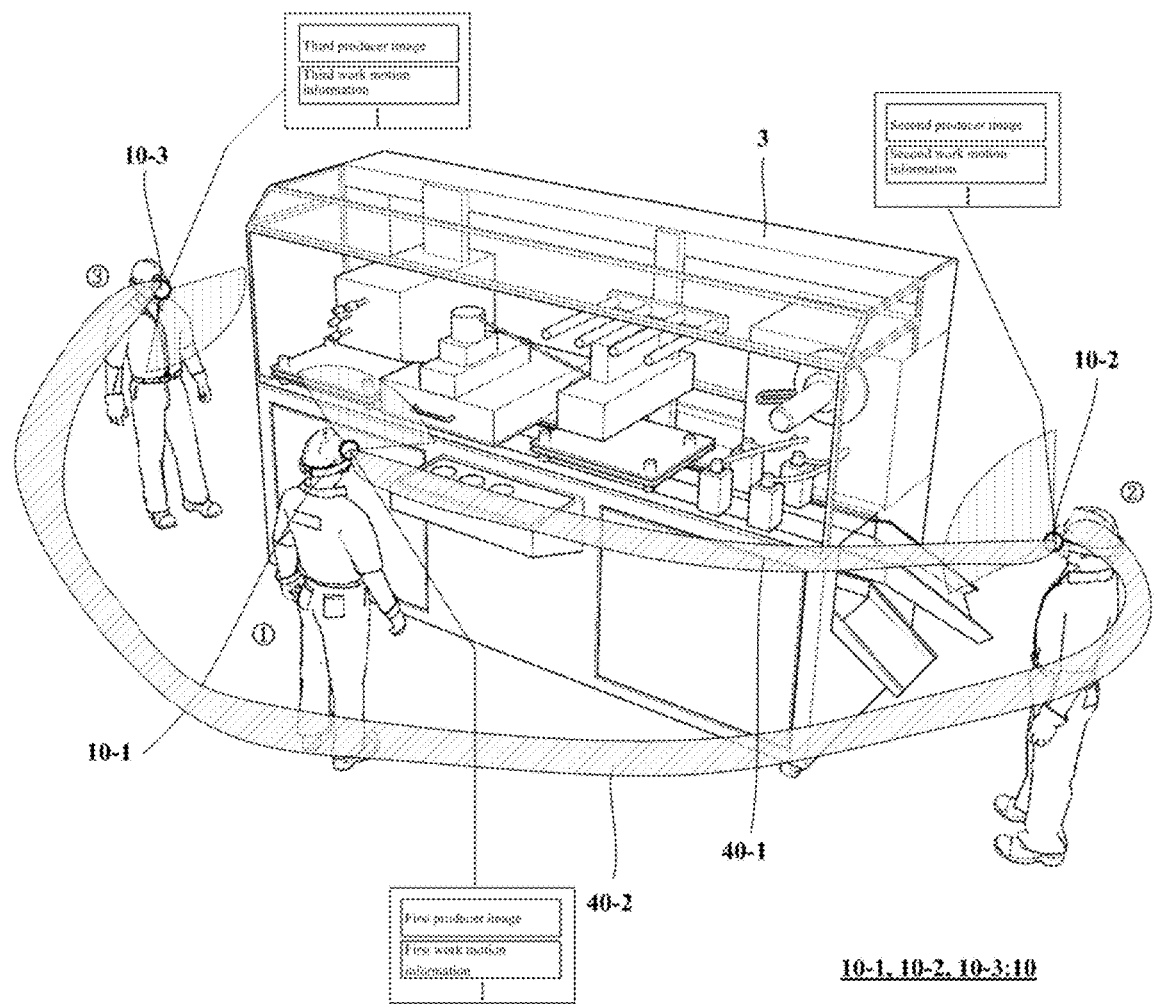

[FIG. 10]
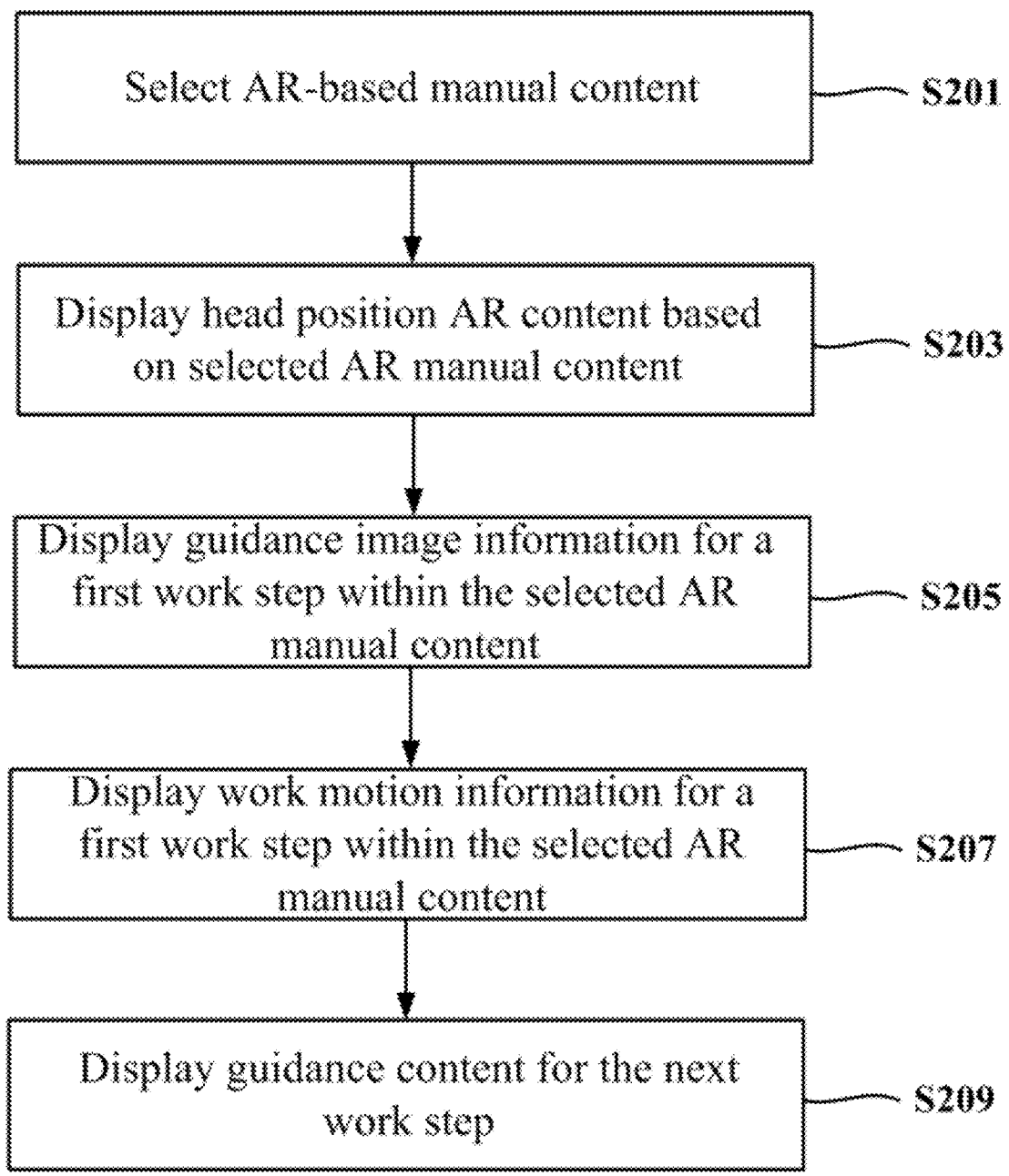

[FIG. 11]
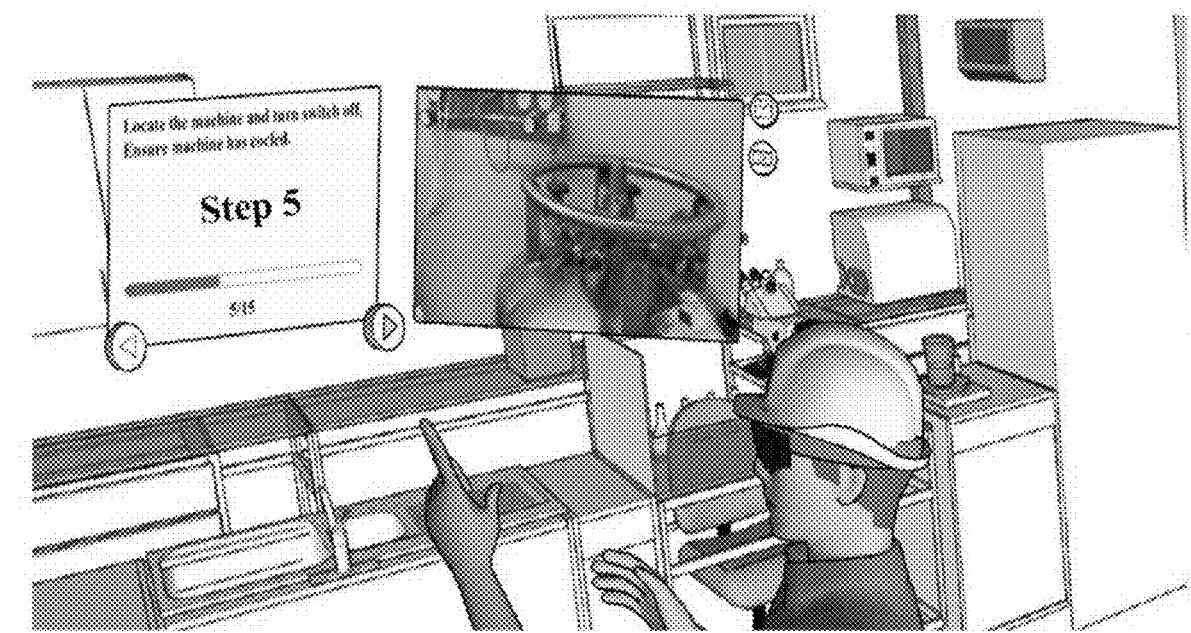
[FIG. 12]
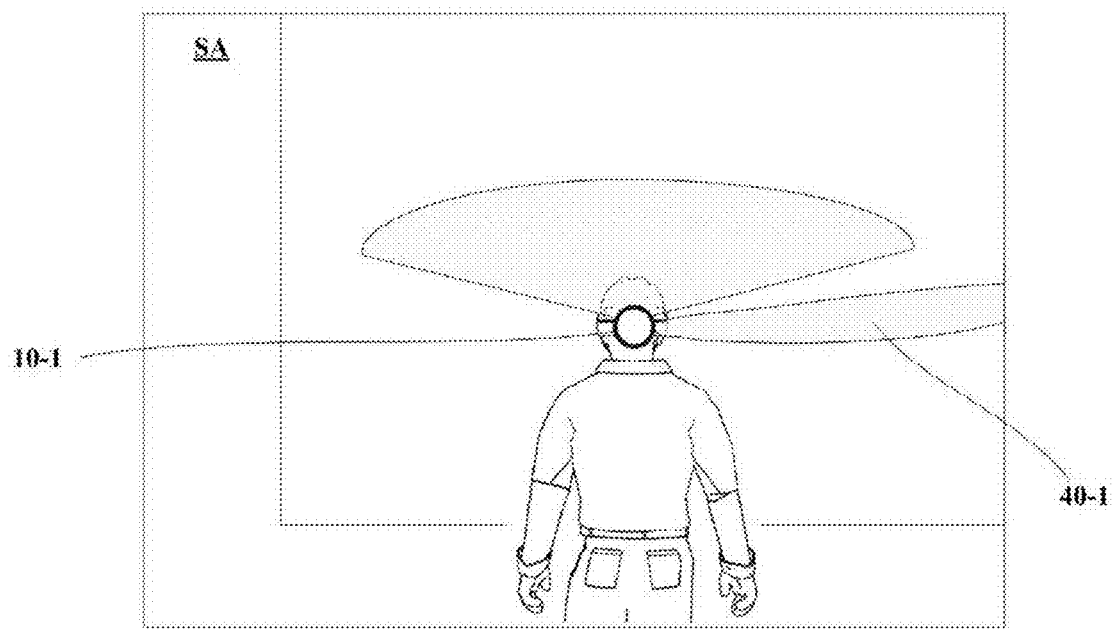

[FIG. 13]
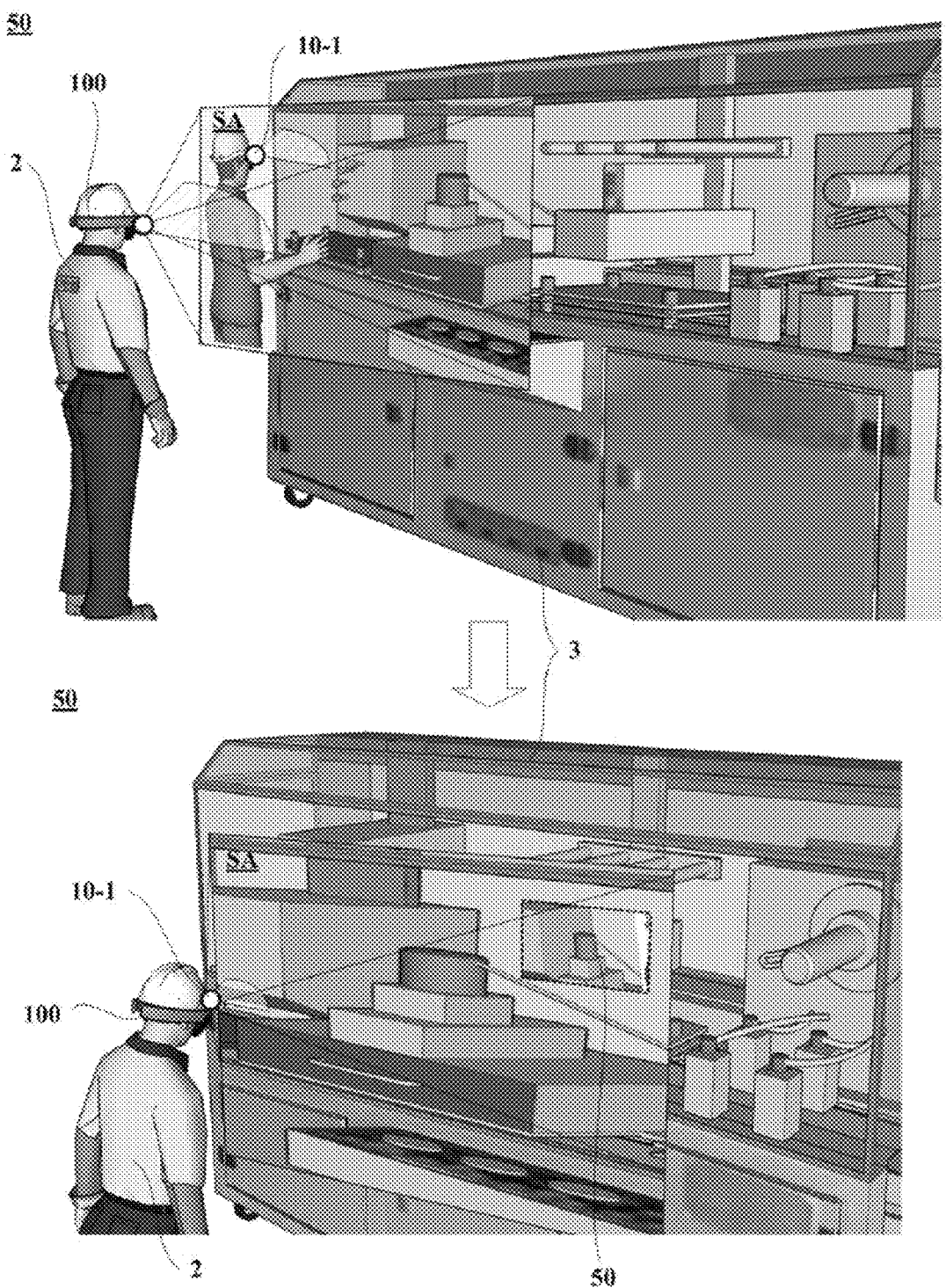

[FIG. 14]
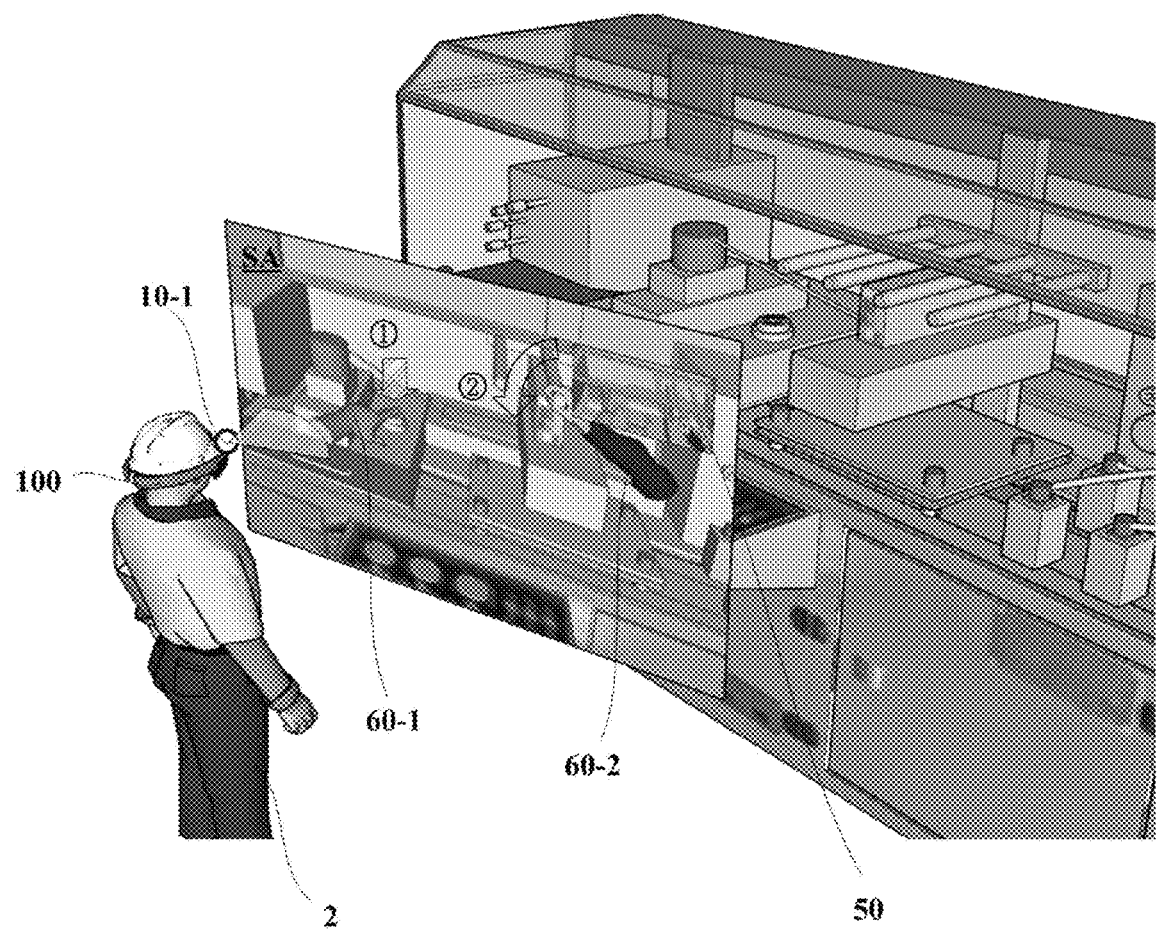

[FIG. 15]
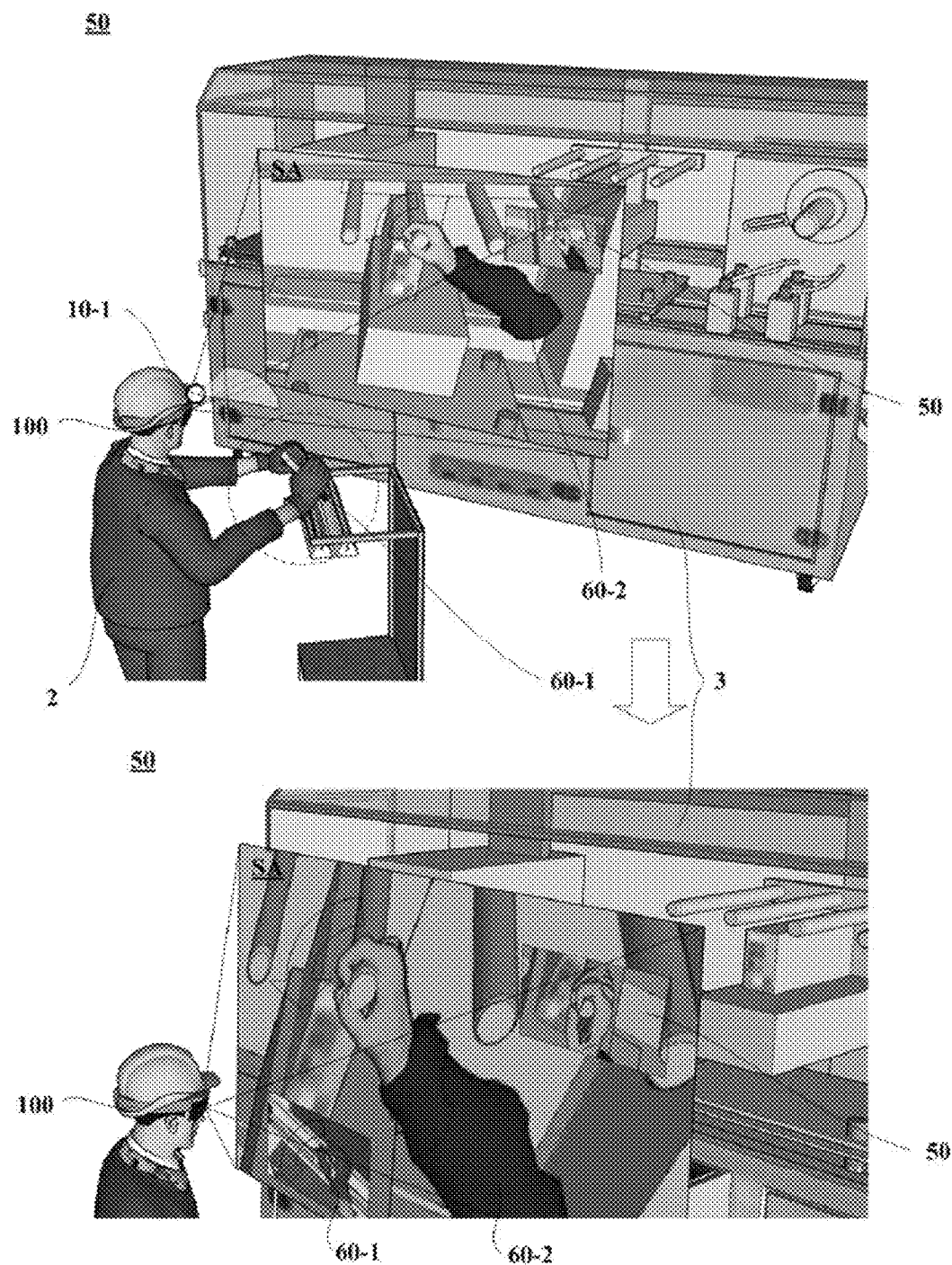

[FIG. 16]
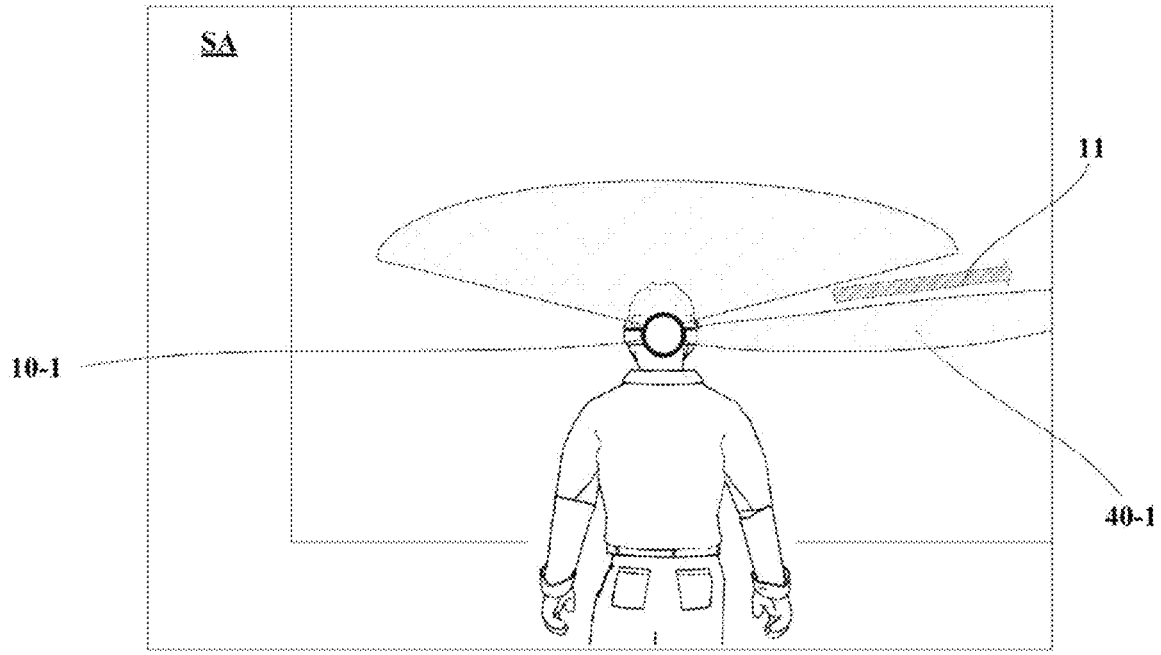

METHOD AND SYSTEM FOR WEARABLE DEVICE-BASED MANUAL PROVIDING

CROSS-REFERENCE TO RELATED APPLICATIONS

This application claims the priority of the Korean Patent Applications NO 10-2020-0186453 filed on Dec. 29, 2020, in the Korean Intellectual Property Office, the disclosure of which is incorporated herein by reference.

BACKGROUND OF THE DISCLOSURE

Field of the disclosure

The present disclosure relates to a method and a system for providing a manual based on a wearable device and, more particularly, to a method and a system for creating and providing augmented reality (AR) manual content based on a wearable device.

Related Art

In general, various facilities for a predetermined purpose (for example, production of specific products) are installed in an industrial site, and a person in charge is assigned to each facility to perform tasks sequentially according to a process required for the production of products.

In performing the sequential process, the work efficiency and productivity are greatly affected by conditions such as a worker's proficiency with an assembly production process for which the worker is responsible.

However, years of experience are required to achieve the skill level to deal with a predetermined process. Even skilled workers may need a considerable amount of time to familiarize themselves with a change due to introduction of a new production process.

Also, no matter how skilled a person is, they may not be fully informed of all production procedures, and it is difficult to predict when and what kind of work demand will arise.

Accordingly, conventional field workers have always carried a manual for assisting in performing their production work.

However, the manual is usually in the form of a book or contains 2D images, making a worker find a page for the process to be performed one after another (for example, to perform work on a specific facility). Moreover, there are cases in which a solution suggested in an old manual may often fail to solve the problem in the field.

Also, in the case of complicated mechanical equipment such as aircraft, hundreds of thousands of manuals are required, making it impossible to carry them because the amount is enormous.

In addition, conventional manuals have a problem explaining sequential production processes necessary to perform a predetermined operation in connection with the workspace in which the corresponding process is performed.

For example, suppose a worker has to perform 1-1 operation on the first side surface of the first facility to perform the first operation on the first facility, has to perform 1-2 operation after moving to the second side surface, and then has to perform 1-3 operation after moving to the third side surface. In this case, a conventional manual is insufficient to help the worker intuitively match the corresponding work procedure with a spatial relationship between the first to third side surfaces, which causes a difficulty for the worker to easily and conveniently understand a process built on a complicated spatial relationship.

Meanwhile, recently, various technologies based on augmented reality (AR) are being developed.

Here, augmented reality (AR), a field of virtual reality, refers to a computer graphic technique that synthesizes virtual objects or information with a real-world environment.

Unlike virtual reality that deals with only virtual space and objects, an augmented reality (AR) service synthesizes virtual objects or information with a real-world environment, thereby providing additional information difficult to obtain from the real world alone.

PRIOR ART REFERENCES

Patents (Patent 1) KR 10-1397908 B1

SUMMARY

The present disclosure has been made to solve the problem above and intends to provide a method and a system for providing a manual based on a wearable device that creates and provides augmented reality (AR)-based manual content.

Also, the present disclosure intends to provide a method and a system for providing a manual based on a wearable device that provides guidance on predetermined work to be done according to a sequential process based on AR-based manual content in association with a relationship to the space in which the corresponding work process is performed.

Technical objects to be achieved by the present disclosure and embodiments according to the present disclosure are not limited to the technical objects described above, and other technical objects may also be addressed.

A method for providing a manual based on a wearable device according to an embodiment of the present disclosure, which is a method for providing an AR-based manual by a manual application executed by at least one processor of the wearable device, comprises obtaining at least one piece of AR manual content for a first work; and providing the AR manual content by executing the obtained AR manual content, wherein the providing AR manual content includes providing head position AR content that visualizes a head pose describing the 3D position and 6 degrees of freedom information of the head of a user who has performed the first work and providing guidance image information that provides guidance on a first process within the first work.

At this time, the displaying head position AR content includes displaying a first virtual object showing a movement path of the user's head according to the first work and a second virtual object showing a step point on the first virtual object, wherein the second virtual object is a virtual object showing the head pose of the user at a step where at least one process is performed within the first work.

Also, the user includes a producer who creates the AR manual content and a worker who performs work based on the AR manual content, and the providing guidance image information includes providing the guidance image information when the head pose of the producer coincides with the head pose of the worker within a specific range.

Also, the providing AR manual content further includes providing work motion information corresponding to the first process, wherein the work motion information is the information tracking the movement of a specific object for the first work, and the providing work motion information corresponding to the first process includes providing a motion object which is an augmented virtual object that interacts with the movement of the specific object based on the work motion information.

Also, when the 3D coordinates of the motion object fall within an image screen of a worker, the providing work motion information further includes displaying the motion object at a position having coordinate values corresponding to the 3D coordinates of the motion object on the image screen of the worker.

Also, when the 3D coordinates of the motion object fall outside an image screen of a worker, the providing work motion information further includes displaying the motion object by moving the motion object to a predetermined area within the image screen of the worker.

Also, when a first process, which is a first step process, is completed among a plurality of processes within the first work, a method for providing a manual based on a wearable device according to an embodiment of the present disclosure further includes providing guidance content that guides the position of the step point virtual object of a second process, which is a second step process.

Also, a method for providing a manual based on a wearable device according to an embodiment of the present disclosure further includes creating the AR manual content, wherein the creating AR manual content includes executing a process for creating the AR manual content, obtaining manual basic information providing metadata for the AR manual content, and generating manual creation parameter information providing basic information required for creating the AR manual content.

At this time, the generating manual creation parameter information includes at least one or more of generating the head pose, generating the guidance image information, and generating work motion information, wherein the generating work motion information includes at least one of extracting a specific object within an image screen of a producer and generating the motion object by transforming the extracted object into a 3D object when the 3D coordinates of the specific object fall within the image screen of the producer and generating the motion object by obtaining sensing data for the specific object based on a depth sensor when the 3D coordinates of the specific object fall outside the image screen of the producer.

Meanwhile, A system for providing a manual based on a wearable device according to an embodiment of the present disclosure comprises a display displaying a virtual object within AR manual content; at least one or more processors; and at least one or more memories, wherein the at least one application, as at least one application that is stored in the memory and provides an AR-based manual by being executed by the at least one or more processors, obtains at least one piece of AR manual content for a first work; executes the obtained AR manual content; provides head position AR content that visualizes a head pose describing the 3D position and 6 degrees of freedom information of the head of a user when the first work is performed based on the executed AR manual content, provides guidance image information that provides guidance on a first process within the first work based on the AR manual content; and provides work motion information corresponding to the first process.

A method and a system for providing a manual based on a wearable device according to an embodiment of the present disclosure creates and provides AR-based manual content using the wearable device, thereby enabling a worker to perform work easily and conveniently according to realistic AR-based work guidance when a complicated work process is involved or when the worker is not a skilled worker.

Also, a method and a system for providing a manual based on a wearable device according to an embodiment of the present disclosure creates and provides AR-based manual content using the wearable device, thereby enabling a worker to perform work quickly and conveniently through a wearable device worn by the worker even when the worker does not carry a separate work manual.

Also, a method and a system for providing a manual based on a wearable device according to an embodiment of the present disclosure provides guidance on predetermined work performed according to a sequential process based on AR-based manual content in association with a relationship to the space in which the corresponding work process is performed, thereby providing work guidance at each position of the corresponding work process easily and clearly even when the work position changes as a worker moves according to the work process (step).

The technical effects of the present disclosure are not limited to the technical effects described above, and other technical effects not mentioned herein may be understood clearly from the description below.

BRIEF DESCRIPTION OF THE DRAWINGS

FIG. 1 illustrates a system for providing a manual based on a wearable device according to an embodiment of the present disclosure.

FIG. 2 is a flow diagram illustrating a method for providing a manual based on a wearable device according to an embodiment of the present disclosure from a viewpoint of a producer.

FIG. 3 illustrates head position information according to an embodiment of the present disclosure.

FIG. 4 illustrates guidance image information according to an embodiment of the present disclosure.

FIG. 5 illustrates a method for configuring a work step point according to an embodiment of the present disclosure.

FIG. 6 illustrates work motion information according to an embodiment of the present disclosure.

FIG. 7 illustrates a method for sensing work motion information based on at least one or more sensors according to an embodiment of the present disclosure.

FIG. 8 illustrates an example of matching and displaying head position AR content with step point information according to an embodiment of the present disclosure.

FIG. 9 illustrates an example of matching at least part of guidance image information to a step point according to an embodiment of the present disclosure.

FIG. 10 is a flow diagram illustrating a method for providing a manual based on a wearable device according to an embodiment of the present disclosure from a viewpoint of a worker.

FIG. 11 illustrates an example in which a worker uses AR manual content provided based on a wearable device according to an embodiment of the present disclosure.

FIG. 12 is an example of providing head position AR content and step point information of AR manual content selected by a worker's wearable device according to an embodiment of the present disclosure.

FIG. 13 illustrates a method for providing guidance image information of AR manual content selected by a worker's wearable device according to an embodiment of the present disclosure.

FIGS. 14 and 15 illustrate a method for providing work motion information of AR manual content selected by a worker's wearable device according to an embodiment of the present disclosure.

FIG. 16 is an example of providing guidance content by a worker's wearable device according to an embodiment of the present disclosure.

DESCRIPTION OF EXEMPLARY EMBODIMENTS

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present disclosure; and should not be understood to preclude the possibility of adding one or more other features or constituting elements. Also, constituting elements in a figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Throughout the disclosure, the same or corresponding constituting element is assigned the same reference number, and repeated descriptions thereof will be omitted.

FIG. 1 illustrates a system for providing a manual based on a wearable device according to an embodiment of the present disclosure.

Referring to FIG. 1, a system for providing a manual based on a wearable device according to an embodiment of the present disclosure may be implemented using at least one or more wearable devices 100-1, 100-2, 100-3, ... , 100-n, 100.

At this time, the at least one or more wearable devices 100 may be connected through a network.

Here, the network refers to a connection structure that exchanges information between individual nodes such as at least one or more wearable devices 100. Examples of such a network include a 3rd Generation Partnership Project (3GPP) network, a Long Term Evolution (LTE) network, a World Interoperability for Microwave Access (WIMAX) network, the Internet, a Local Area Network (LAN), a Wireless Local Area Network (Wireless LAN), a Wide Area Network (WAN), a Personal Area Network (PAN), a Bluetooth network, a satellite broadcasting network, an analog broadcasting network, and a Digital Multimedia Broadcasting (DMB) network but are not limited to the examples.

—Wearable Device: 100

A wearable device 100 according to an embodiment of the present disclosure may provide a wearable device-based manual provision service (in what follows, a manual provision service) implementing manual content that provides guidance on predetermined work using virtual reality.

Specifically, the wearable device 100 according to the embodiment may be a predetermined computing device installed with a manual application that implements a manual provision service.

Also, the wearable device 100 according to the embodiment allows a user to freely perform a computing action while the user is moving or performing an activity by being attached to the user's body or clothes and may further mean an application capable of performing particular computing functions.

Such a wearable device 100 may be implemented based on smart glasses, a smartwatch, and/or a head-mounted display (HMD). However, it would be the most preferred embodiment of the present disclosure regarding usability if the wearable device 100 is implemented using smart glasses.

In what follows, the wearable device 100 according to the embodiment of the present disclosure will be described with reference to smart glasses. However, the present disclosure is not limited to the specific type of wearable device.

Also, smart glasses according to the embodiment of the present disclosure may be a predetermined computing device including at least one or more memories storing various application programs, data, and/or commands for implementing a manual provision service and at least one or more processors for data processing.

—Smart Glasses-Based Method for Providing a Manual: A Viewpoint of a Producer

In what follows, a method for creating AR manual content by a manual application executed by at least one or more processors of smart glasses will be described in detail with reference to FIGS. 2 to 9.

At this time, a user according to the present embodiment may be a producer who creates manual content.

Also, at least one or more processors of smart glasses according to the embodiment of the present disclosure may execute at least one or more manual applications stored in at least one or more memories or run the applications in the background.

FIG. 2 is a flow diagram illustrating a method for providing a manual based on a wearable device 100 according to an embodiment of the present disclosure from a viewpoint of a producer.

Referring to FIG. 2, the manual application according to the embodiment executed by at least one or more processors of the smart glasses or run in the background may execute a manual content creation process S101.

Specifically, the manual application according to the embodiment may provide a user interface (UI) through which a user may create manual content.

At this time, the manual application may visualize the user interface as an augmented reality object and display the visualized user interface on a display.

Also, the manual application according to the embodiment may execute a manual content creation process based on an input from a user (here, a producer) through a provided user interface.

When the manual content creation process is executed as described above, the manual application according to the embodiment may obtain manual basic information S103.

Here, the manual basic information according to the embodiment may be the information providing metadata related to a manual to be produced.

Specifically, the manual application according to the embodiment may provide a user interface through which a user may input manual information when the manual content creation process is executed.

And the manual application may obtain manual information on the manual content to be created based on the producer's input through the provided user interface.

For example, the manual application may obtain producer information related to a manual to be produced, manual target object information, and/or work specification information as the manual information.

Also, the manual application according to the embodiment may generate manual creation parameter information (in what follows, manual parameter information) S105.

Here, the manual parameter information according to the embodiment refers to the information including basic data required to create AR manual content, which may include head position information, guidance image information, and/or work motion information according to the embodiment.

FIG. 3 illustrates head position information according to an embodiment of the present disclosure.

Specifically, referring to FIG. 3, a manual application according to the embodiment may generate 1) head position information.

Here, the head position information according to the embodiment may be the information estimating the pose of a user's head in the 3D space.

Specifically, the head position information according to the embodiment may include the 3D position information and 6 degrees of freedom (DoF) information of the user's head.

Here, 3D position information may mean at least one or more points on the user's head, which is used as the reference with respect to which the pose of an object (the user's head in the embodiment) moving in the 3D space is estimated.

For example, the 3D position information may be a point representing the center point between the eyes of the user.

Also, the 6 DoF information may be pose estimation information obtained by measuring six rotational and translational motion elements of an object (a user's head in the embodiment) moving in the 3D space.

Specifically, the 6 DoF information according to the embodiment may be the information obtained by measuring left/right rotational motion (roll) around the X-axis, forward/backward rotational motion (pitch) around the Y-axis, and up/down rotational motion (yaw) around the Z-axis; and forward/back (surge), left/right (sway), and up/down (heave) translational motions in the 3D cartesian coordinate system.

In the embodiment, the 3D position information and 6 DoF information may be used as reference parameters for augmenting a predetermined virtual object that interacts with the user when a virtual object augmentation process is performed.

In the embodiment, the manual application may track the 3D position information and 6 DoF information of the head of the user (here, a producer) based on at least one or more sensors.

At this time, the at least one or more sensors according to the embodiment may include a GPS sensor and/or a position sensor (gyroscope and/or accelerometer).

Also, the manual application according to the embodiment may generate head position information of the producer 1 using the sensing data (namely, the 3D position information and 6 DoF information) obtained based on the tracking performed as described above.

As described above, the manual application may track and store the head position (namely, the orientation and viewpoint of the head) of the producer 1 while the producer 1 is performing predetermined work to provide work guidance, thereby providing more accurate work position information when work guidance on the corresponding work is provided later to a worker.

FIG. 4 illustrates guidance image information according to an embodiment of the present disclosure.

Also, referring to FIG. 4, the manual application according to the embodiment may generate 2) guidance image information.

Here, guidance image information according to the embodiment may be the information that provides guidance on predetermined work based on the producer 1 image captured along the viewpoint of the producer 1.

In other words, the guidance image information according to the embodiment may include the producer 1 image captured from the viewpoint of the producer 1 and predetermined work guidance information.

Here, the work guidance information may be obtained based on a user interface through which a user may enter work guidance and may include voice data of the producer 1, work step configuration information, and/or virtual object input information according to the embodiment.

Specifically, the manual application according to the embodiment may obtain images captured from the viewpoint of the producer 1 based on at least one or more sensors including an image sensor.

Also, the manual application may obtain predetermined guidance information by providing a work guidance input user interface.

Also, the manual application according to the embodiment may generate guidance image information based on the images and guidance information obtained as described above.

FIG. 5 illustrates a method for configuring a work step point according to an embodiment of the present disclosure.

At this time, referring to FIG. 5, the manual application according to the embodiment may include work step point information in the work guidance information based on the input of the producer 1 through a user interface and/or a built-in process.

Here, the step point information according to the embodiment may be the information representing a point (turning point) at which each work process distinguished from the others according to a predetermined criterion (a start and/or end point of each work step according to the embodiment) is performed.

Also, the step point information according to the embodiment may further include head pose (namely, head position, 6 DoF pose, and/or viewpoint) information of the corresponding producer 1.

The manual application according to the embodiment may match at least one or more step points to a predetermined position on the movement path of the head of the user (producer 1) formed according to the head position information.

For example, the manual application may set a first step point by matching the first step point, where a first work step performed on a first target object 3 is performed, to a first position on the head position movement path based on a set step point button provided through a sensing area (SA) for a predetermined work environment 50.

Also, the manual application according to the embodiment may set a second step point by matching the second step point, where a second work step is performed after the first work step is completed, to a second position on the head position movement path based on the input of the producer 1 for the set step point button.

Also, the manual application according to the embodiment may display a virtual object corresponding to the step point on a predetermined position that matches the step point, detailed descriptions of which will be given later.

As described above, the manual application manages image, voice, and/or virtual object information that provides work guidance by matching the information to each step point of the corresponding work step, thereby providing guidance information so that a worker may perform a step-by-step work process at a correct and optimal position where the corresponding step-by-step work has to be performed.

FIG. 6 illustrates work motion information according to an embodiment of the present disclosure.

Also, referring to FIG. 6, the manual application according to the embodiment may generate 3) work motion information.

Here, the work motion information according to the embodiment may be the information that measures and tracks motion of a specific object (for example, the producer 1, the hand of the producer 1, and/or a tool).

FIG. 7 illustrates a method for sensing work motion information based on at least one or more sensors according to an embodiment of the present disclosure.

Specifically, referring to FIG. 7, the manual application according to the embodiment may obtain sensing data describing the movement (motion) of a specific object (for example, the producer 1, the hand of the producer 1, and/or a tool) based on at least one or more sensors 110-1, 110-2, . . . ; 100 including a depth sensor, a laser sensor, and/or an image sensor.

And the manual application may generate work motion information based on the obtained sensing data.

At this time, the manual application according to the embodiment may generate a virtual object based on the generated work motion information.

Specifically, the manual application according to the embodiment may generate a motion object which is a predetermined virtual object augmented by interacting with the movement of a specific object (for example, the producer 1, the hand of the producer 1, and/or a tool) based on the generated work motion information.

For example, the manual application may generate a motion object as a virtual object in the shape of a hand showing the movement of the hand 20 of the producer 1.

More specifically, the manual application according to the embodiment may capture the movement of a specific object for which motion information is to be obtained using at least one sensor 110 (for example, an image sensor).

Also, the manual application may separate (extract) the specific object from the captured image by performing image processing (for example, object detection) and/or image segmentation on the captured image.

Also, the manual application may generate a motion object by transforming the separated specific object into a virtual object that models the corresponding specific object as a 3D object.

Also, the manual application according to the embodiment may sense the depth and/or motion of a specific object based on at least one sensor 110 (for example, a depth sensor and/or a laser sensor).

And the manual application may generate a 3D motion object based on the sensed information.

Also, when a specific object for which motion information is to be generated exists within the field of view (namely, sensing area (SA)) of the producer 1, the manual application according to the embodiment may separate the corresponding specific object from an image that captures the specific object and generate a motion object by transforming the separated specific object.

On the other hand, when a specific object for which motion information is to be generated exists outside the field of view (namely, sensing area (SA)) of the producer 1, the manual application may generate a motion object in a way that a 3D object is generated by sensing depth and/or motion of the specific object.

As described above, the manual application may catch the detailed motion of the producer 1 who performs work more clearly by tracking and managing the motion of a specific object such as the hand of the producer 1 or a tool that provides work guidance separately through at least one or more sensors 110, thereby providing more detailed and precise guidance when guidance on the corresponding work is provided later to a worker.

Also, when the motion of a specific object (for example, the hand of the producer 1 and/or a tool) required for work guidance gets out of the field of view (namely, an image screen as seen from the viewpoint of the producer 1) of the producer 1 and is not captured within the corresponding image, the manual application senses the corresponding object separately, tracks the motion of the object, and generates and provides a virtual object corresponding to the object, thereby further improving the quality of work guidance.

Also, the manual application according to the embodiment may generate manual parameter information that provides basic data required for creating AR manual content based on the head position information, guidance image information, and/or work motion information generated as described above.

Also, the manual application according to the embodiment may create AR manual content based on the manual parameter information generated as described above S107.

Here, the AR manual content according to the embodiment may be the augmented reality content that provides guidance on a work step, a work method, and/or a work pattern of predetermined work based on a virtual object.

Specifically, the manual application according to the embodiment may create 1) head position AR content.

Here, the head position AR content according to the embodiment may be the information visualized through augmented reality by tracking the head pose (namely, 3D position and 6 degrees of freedom pose of the head) of the producer 1 due to work activity.

In other words, the manual application according to the embodiment may visualize the viewpoint information according to the head position information of the producer 1 who produces the corresponding guidance manual based on the head position AR content and provide the visualized information in the form of augmented reality.

The manual application according to the embodiment may generate head position AR content based on the head position information of the manual parameter information.

Specifically, the manual application according to the embodiment may generate a virtual object based on the head position movement path, 6 degrees of freedom pose, and/or viewpoint information of the producer 1 and create head position AR content capable of augmenting and displaying the generated virtual object.

For example, the manual application may implement a virtual object that forms a predetermined line along the corresponding head position movement path based on the head position movement path information. Also, in the example, the manual application may implement 6 degrees of freedom information as a predetermined virtual object having a human head shape. Also, for example, the manual application may implement a virtual object representing the corresponding viewpoint information in the form of a predetermined arrow based on the viewpoint information.

As described above, the manual application visualizes the head position information of the producer 1 based on the virtual object, thereby providing information on the workflow and posture guided by the producer 1 when providing work guidance more easily and intuitively.

Also, the manual application according to the embodiment may match guidance image information based on the 2) generated head position AR content.

Specifically, the manual application according to the embodiment may match the guidance image information (in the embodiment, a producer 1 image, voice data of the producer 1, work step configuration information, and/or virtual object input information) by applying the guidance image information to the head position AR content.

FIG. 8 illustrates an example of matching and displaying head position AR content with step point information according to an embodiment of the present disclosure.

More specifically, referring to FIG. 8, the manual application according to the embodiment may match the head position AR content 40-1, 40-2, . . . ; 40 to the step point information included in the guidance image information.

In other words, the manual application according to the embodiment may associate the step point information matched to the head position information of the producer 1 with the head position AR content 40 and further match a predetermined step point virtual object 10-1, 10-2, 10-3; 10 representing the corresponding step point information to the head position information.

For example, the manual application may match a first step point 10-1 where a first work step is performed to a first position on the head position movement path visualized in the form of augmented reality and also match a virtual object representing the first step point 10-1 to the first position.

And the manual application according to the embodiment may match a second step point 10-2 where a second work step is performed after the first work step is completed to a second position on the head position movement path visualized in the form of augmented reality and also match a virtual object representing the second step point 10-2 to the second position.

As described above, the manual application may provide a work position and a viewpoint for each work step more intuitively and clearly by additionally applying step point information representing the position where a step-by-step work (process) included in the corresponding work is performed to the head position AR content 40 representing the workflow and pose of the producer 1 and providing the head position AR content 40.

FIG. 9 illustrates an example of matching at least part of guidance image information to a step point according to an embodiment of the present disclosure.

Also, referring to FIG. 9, the manual application according to the embodiment may match the producer 1 image to the corresponding step point.

Specifically, the manual application according to the embodiment may match the producer 1 image captured from the viewpoint of the producer 1 at each step point to the corresponding step point.

The manual application according to the embodiment may match the 2D first work image capturing a first work performed at a first step point 10-1 on the head position movement path from the viewpoint of the producer 1 to the first step point 10-1. In the same way, the manual application may match a second work performed at a second step point 10-2 to the second step point 10-2.

As described above, the manual application may manage position information, pose information, and/or producer 1 image information related to each work step by matching the information to each other, thereby managing guidance information on the corresponding work systematically even if the work includes a complicated, multi-step work process and providing the information systematically throughout the entire work steps when the corresponding guidance information is provided.

Also, the manual application according to the embodiment may match the work motion information corresponding to the 3) producer 1 image.

Specifically, the manual application according to the embodiment may further match the step point matched to the head position AR content 40 and work motion information corresponding to the producer 1 image to the head position AR content 40.

More specifically, the manual application may display a motion object generated based on work motion information by matching the motion object to the producer 1 image.

In other words, the manual application according to the embodiment may match the motion object, which is an augmented virtual object interacting with the movement of a specific object (for example, the producer 1, a hand of the producer 1, and/or a tool), to the corresponding producer 1 image.

For example, the manual application may manage the motion object in the shape of a hand moving in response to the hand motion 20 of the producer 1 within the corresponding producer 1 image by matching the motion object to the corresponding producer 1 image.

In this way, when guiding the corresponding work step, the manual application may further match and manage motion objects related to each work step and provide an additional virtual object (namely, the motion object) capable of showing the producer 1's motion that provides guidance on the corresponding work in more detail. Through the operation above, a worker may understand and perform the corresponding work more easily, and at the same time, the accuracy and quality of the provided work guidance may be improved.

Also, the manual application according to the embodiment may create 4) AR manual content.

In other words, as described above, the manual application according to the embodiment may create and store AR manual content by matching guidance image information (in the embodiment, step point information and/or producer 1 image) and/or work motion information to the head position AR content 40.

At this time, the manual application according to the embodiment may store and manage the corresponding AR manual content by adding manual basic information containing metadata related to a manual to be produced to the AR manual content.

As described above, by creating and providing AR-based manual content, the manual application may enable a worker to perform the corresponding work easily and conveniently according to realistic, AR-based work guidance even when the work requires a complicated work process or the worker is not skilled with the work.

—Smart Glasses-Based Method for Providing a Manual: A Viewpoint of a Worker

In what follows, a method for providing AR manual content by a manual application executed by at least one or more processors of smart glasses will be described in detail with reference to FIGS. 10 to 16.

At this time, a user according to the present embodiment may be a worker who receives work guidance based on manual content.

FIG. 10 is a flow diagram illustrating a method for providing a manual based on a wearable device according to an embodiment of the present disclosure from a viewpoint of a worker.

Referring to FIG. 10, the manual application according to the embodiment executed by at least one or more processors of the smart glasses or run in the background may select AR manual content S201.

In other words, the manual application according to the embodiment may select AR manual content to be displayed.

The manual application according to the embodiment may select AR manual content to be displayed based on an input of a worker obtained from a user interface through which AR manual content may be selected.

For example, the manual application may obtain a worker input that includes a selection of work type and/or producer 1 selection based on an augmented reality manual selection interface and determine AR manual content to be displayed based on the obtained input.

In another embodiment, when a predetermined object is detected based on at least one or more sensors 110 (for example, an image sensor), the manual application may automatically select the AR manual content matched to the detected object.

For example, when a first target object 3 is detected from real-time sensing based on an image sensor, the manual application may automatically select at least one or more pieces of AR manual content stored in the memory as the AR manual content to be displayed in response to the detected first target object 3.

Also, the manual application according to the embodiment may display the head position AR content 40 based on the selected AR manual content S203.

Specifically, the manual application according to the embodiment may output the head position AR content 40 that visualizes the producer 1's head position movement path providing guidance on predetermined work as a virtual object.

Also, the manual application according to the embodiment may augment and display a virtual object that visualizes 6 degrees of freedom information and/or viewpoint information according to the head position information of the producer 1 who has produced the corresponding guidance manual.

For example, the manual application may display the head position movement path information as a virtual object formed along a predetermined line. Also, the manual application in one example may display the 6 degrees of freedom information based on a virtual object in the form of a predetermined avatar. Also, the manual application in one example may provide the viewpoint information by displaying the information as a virtual object in a predetermined arrow shape.

FIG. 12 is an example of providing head position AR content 40 and step point information of AR manual content selected by a worker's wearable device 100 according to an embodiment of the present disclosure.

At this time, referring to FIG. 12, the manual application according to the embodiment may further display a step point virtual object 10 matched to the head position AR content 40.

Specifically, the manual application may also display the step point virtual object 10 being matched to a predetermined position on the head position movement path of the producer 1 and providing the head pose (namely, the head position, 6 degrees of freedom pose, and/or viewpoint) information of the corresponding producer 1.

As described above, the manual application displays the head position AR content 40 of the AR manual content that includes the work guidance for a worker, thereby enabling the worker to recognize the information on the workflow, posture, or position required to perform the corresponding work easily and conveniently for each work step.

Also, the manual application according to the embodiment may provide predetermined basic manual images related to the corresponding AR manual content (for example, metadata information on the manual content) and/or the entire work process summary image in the form of augmented reality content.

Also, the manual application according to the embodiment may display guidance image information for a first work step within the selected AR manual content S205.

Specifically, the manual application according to the embodiment may display the guidance image information matched to the first work step (in the embodiment, the first step point 10-1 and/or a preconfigured, first sub-work step) within the selected AR manual content.

In what follows, each work step will be described in terms of step point, but the present disclosure is not limited to the specific description.

FIG. 13 illustrates a method for providing guidance image information of AR manual content selected by a worker's wearable device 100 according to an embodiment of the present disclosure.

Referring to FIG. 13, the manual application according to the embodiment may determine whether the head pose (namely, the position, 6 degrees of freedom pose, and/or viewpoint of the producer 1's head) at the first step point 10-1 of the AR manual content matches the head pose of the worker 2 (namely, the position, 6 degrees of freedom pose, and/or viewpoint of the worker 2's head). For example, if the head position of the producer 1 is located within a predetermined distance from the head position of the worker 2, it may be determined that the head positions match each other.

Also, when the head position of the producer 1 and the head position of the worker 2 are located within a predetermined distance from each other, and the gaze direction of the worker 2 is located within a predetermined radius along the gaze direction of the producer 1, it may be determined that the two head poses match each other.

At this time, if the manual application determines that the head pose of the producer 1 at the first step point 10-1 match the head pose of the worker 2, the manual application may display the guidance image information 50 (in the embodiment, the producer 1 image) matching the first step point 10-1.

In other words, the manual application according to the embodiment may display and provide the guidance image (for example, the producer 1 image) for the work to be performed at the first step point 10-1 when the head position of the producer 1 at the first step point 10-1 matches and corresponds to the head position of the worker 2.

As described above, when the head pose of the producer 1 who provides work guidance on predetermined work matches the head pose of the worker 2 who tries to perform the work, the manual application may provide the information on the corresponding work guidance, thereby enabling the worker 2 to proceed with the work at the position and posture optimized for performing the corresponding work.

Also, the manual application according to the embodiment may display work motion information on the first step point 10-1 (namely, the first work step) within the selected AR manual content S207.

FIGS. 14 and 15 illustrate a method for providing work motion information of AR manual content selected by a worker 2's wearable device 100 according to an embodiment of the present disclosure.

Specifically, referring to FIG. 14, the manual application according to the embodiment may display work motion information matching the first step point 10-1 (namely, the first work step) within the selected AR manual content.

In other words, the manual application according to the embodiment may display a predetermined motion object 60-1, 60-2, . . . ; 60 included in the work motion information of the producer 1 together when providing the guidance image information 50 by matching the motion object to the guidance image information 50 for the first step point 10-1.

When providing first guidance image information 5 for the first step point 10-1, the manual application according to the embodiment may augment and display a first motion object 60 matched to the first guidance image information 50 on the image screen of the worker 2.

For example, the manual application may display the first motion object 60 that interacts and moves according to the hand motion of the producer 1 and/or the movement of a predetermined tool by superimposing the first motion object 60 on the image screen of the worker 2.

At this time, when the work motion information may be displayed without a predetermined loss at a predetermined position within the field of view of the worker 2 (namely, the image screen provided to the worker 2), the manual application according to the embodiment may augment and display the corresponding work motion information on the image screen of the worker 2 without modification of the work motion information.

When the work motion information may be displayed on the image screen of the worker 2 without a predetermined loss, the manual application according to the embodiment may display the motion object 60 on the image screen of the worker 2 at the position corresponding to the 3D coordinates of the motion object 60 included in the work motion information.

However, depending on the situations, the work motion information of the producer 1 provided through the AR manual content (for example, the information used to convert the hand motion of the producer 1 performing specific work to the motion object 60 in the form of a hand) may be located outside the field of view (namely, the image screen provided to the worker 2) of the corresponding worker 2.

For example, when the worker 2 has to perform work for the second area while gazing at the first area, a loss may occur such that the work motion information of the producer 1 explaining the work for the second area (for example, the motion object 60 corresponding to the hand motion of the worker 2) may be cut off from the image screen of the corresponding worker 2 or become invisible.

Referring to FIG. 15, when work motion information gets out of the image screen provided to the worker 2 and a predetermined loss occurs, the manual application according to an embodiment of the present disclosure may display the corresponding work motion information by moving the corresponding work motion information from its original position to a predetermined position within the image screen of the worker 2.

For example, when the image screen of the worker 2 displays the first area and the work motion information of the producer 1 is located on the second area rather than the first area, the manual application may move the work motion information located in the second area into a predetermined position (for example, the position at which the loss of the work motion information is minimized and the worker 2's view is least blocked (for example, the edge area on one side of the image screen of the worker 2)) of the first area and display the work motion information on a pop-up window 70.

In another embodiment, when the work motion information gets out of the image screen provided to the worker 2, the manual application may display a predetermined virtual object guiding the worker 2 into the area in which the corresponding work motion information is located.

For example, when the image screen of the worker 2 displays the first area and the work motion information of the producer 1 is located on the second area rather than the first area, the manual application may provide the work motion information by augmenting and displaying a virtual arrow object guiding existence of the work motion information located in the second area and position information of the work motion information.

As described above, the manual application provides the motion object 60, which helps the worker 2 recognize the work that the worker 2 has to perform, more easily and accurately by displaying the motion object 60 on a screen at which the corresponding worker 2 gazes, thereby improving the usability and quality of the manual content provided to the worker 2 based on augmented reality.

Also, the manual application enables the worker 2 to check the information on the work motion being performed outside the field of view of the worker 2 within the field of view of the corresponding worker 2, thereby improving the reliability of the work guidance and at the same time, allowing the worker 2 to conveniently proceed with the work that should be performed for multiple spaces, through which stability and completeness of the work may be improved.

FIG. 16 is an example of providing guidance content by a worker 2's wearable device 100 according to an embodiment of the present disclosure.

Also, referring to FIG. 16, the manual application according to the embodiment may display guidance content 11 for the next step point (namely, the next work step) S209.

Specifically, when the work at the first step point 10-1 (namely the first work step) is completed or displaying of the guidance image shown with respect to the first step point 10-1 is completed, the manual application according to the embodiment may provide guidance content 11 which is a predetermined virtual object that guides the head position of the next step point (namely, the next work step).

For example, the manual application may augment and display the guidance content 11 guiding the position and/or orientation of the head position where the next step point (the next work step) is defined using an arrow mark on the image screen of the corresponding worker 2.

As described above, when work includes sub-processes (in the embodiment, step points) performed step-by-step, the manual application guides a worker to the point where the next step point is located after a process of one step point is completed, thereby quickly and easily guiding the worker to the point where the next process is performed after the first process is completed.

As described above, a method and a system for providing a manual based on a wearable device 100 according to an embodiment of the present disclosure creates and provides AR-based manual content using the wearable device 100, thereby enabling a worker 2 to perform work easily and conveniently according to realistic AR-based work guidance when a complicated work process is involved or when the worker 2 is not a skilled worker.

Also, a method and a system for providing a manual based on a wearable device 100 according to an embodiment of the present disclosure creates and provides AR-based manual content using the wearable device 100, thereby enabling a worker 2 to perform work quickly and conveniently through a wearable device 100 worn by the worker 2 even when the worker 2 does not carry a separate work manual.

Also, a method and a system for providing a manual based on a wearable device 100 according to an embodiment of the present disclosure provides guidance on predetermined work performed according to a sequential process based on AR-based manual content in association with a relationship to the space in which the corresponding work process is performed, thereby providing work guidance at each position of the corresponding work process easily and clearly even when the work position changes as a worker moves according to the work process (step).

Also, the embodiments of the present disclosure described above may be implemented in the form of program commands which may be executed through various types of computer constituting elements and recorded in a computer-readable recording medium. The computer-readable recording medium may include program commands, data files, and data structures separately or in combination thereof. The program commands recorded in the medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be replaced with one or more software modules to perform the processes of the present disclosure, and vice versa.

Specific implementation of the present disclosure are embodiments, which does not limit the technical scope of the present disclosure in any way. For the clarity of the disclosure, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of the present disclosure but has to be defined by the appended claims.

What is claimed is:

1. A method for providing an augmented reality (AR)-based manual by a manual application executed by at least one processor of a wearable device, the method comprising:
   obtaining at least one piece of AR manual content for a first work; and
   providing the AR manual content by executing the obtained AR manual content,
   wherein the providing AR manual content includes
   providing head position AR content that visualizes a head pose describing 3D position and 6 degrees of freedom information of the head of a user who has performed the first work and
   providing guidance image information that provides guidance on a first process within the first work.

2. The method of claim 1, wherein providing head position AR content includes displaying a first virtual object showing a movement path of the user's head according to the first work and a second virtual object showing a step point on the first virtual object,
   wherein the second virtual object is a virtual object showing the head pose of the user at a step where at least one process is performed within the first work.

3. The method of claim 2, wherein the user includes a producer who creates the AR manual content and a worker who performs work based on the AR manual content, and
   the providing guidance image information includes providing the guidance image information when the head pose of the producer coincides with the head pose of the worker within a specific range.

4. The method of claim 2, further including providing guidance content that guides the position of the step point virtual object of a second process, which is a second step process, when a first process, which is a first step process among a plurality of processes within the first work, is completed.

5. The method of claim 1, wherein the providing AR manual content further includes providing work motion information corresponding to the first process,
   wherein the work motion information is the information tracking the movement of a specific object for the first work, and
   the providing work motion information corresponding to the first process includes providing a motion object which is an augmented virtual object that interacts with the movement of the specific object based on the work motion information.

6. The method of claim 5, wherein, when the 3D coordinates of the motion object fall within an image screen of a worker, the providing work motion information further includes displaying the motion object at a position having coordinate values corresponding to 3D coordinates of the motion object on the image screen of the worker.

7. The method of claim 5, wherein, when 3D coordinates of the motion object fall outside an image screen of a worker, the providing work motion information further includes displaying the motion object by moving the motion object to a predetermined area within the image screen of the worker.

8. The method of claim 1, further including creating the AR manual content,
wherein the creating AR manual content includes
executing a process for creating the AR manual content,
obtaining manual basic information providing metadata for the AR manual content, and
generating manual creation parameter information providing basic information required for creating the AR manual content.

9. The method of claim 8, wherein the generating manual creation parameter information includes at least one or more of generating the head pose, generating the guidance image information, and generating work motion information,
wherein the generating work motion information includes at least one of extracting a specific object within an image screen of a producer and generating the motion object by transforming the extracted object into a 3D object when 3D coordinates of the specific object fall within the image screen of the producer and generating the motion object by obtaining sensing data for the specific object based on a depth sensor when the 3D coordinates of the specific object fall outside the image screen of the producer.

10. A system for providing a manual based on a wearable device, the system comprising:
a display displaying a virtual object within AR manual content;
at least one or more processors; and
at least one or more memories,
wherein the at least one application, as at least one application that is stored in the memory and provides an AR-based manual by being executed by the at least one or more processors,
obtains at least one piece of AR manual content for a first work;
executes the obtained AR manual content;
provides head position AR content that visualizes a head pose describing the 3D position and 6 degrees of freedom information of the head of a user when the first work is performed based on the executed AR manual content,
provides guidance image information that provides guidance on a first process within the first work based on the AR manual content; and
provides work motion information corresponding to the first process.

* * * * *